Jan. 26, 1926.  
D. A. WARD  
TIRE CHAIN FASTENER  
Filed Oct. 26, 1925  
1,570,978

Inventor  
David A. Ward,  
By R. Crale Herrick  
Attorney

Patented Jan. 26, 1926.

1,570,978

UNITED STATES PATENT OFFICE.

DAVID ALLEN WARD, OF PRIMROSE, NEBRASKA, ASSIGNOR OF ONE-HALF TO E. B. BROUGHTON, OF PRIMROSE, NEBRASKA.

TIRE-CHAIN FASTENER.

Application filed October 26, 1925. Serial No. 64,883.

*To all whom it may concern:*

Be it known that DAVID ALLEN WARD, a citizen of the United States, residing at Primrose, in the county of Boone and State of Nebraska, has invented certain new and useful Improvements in Tire-Chain Fasteners, of which the following is a specification.

This invention relates to improvements in fastening means for anti-skid chains, and more particularly to an adjustable or step by step fastener which may be quickly moved to the desired position or adjustment, and the free end of an anti-skid chain securely locked therein.

An object of the invention is to provide an improved form of fastening device for anti-skid chains, which will be inexpensive to manufacture, and will be positive in operation.

A further object of the invention is to provided a fastening device for anti-skid chains which may be quickly adjusted to any point in a plurality of adjusting notches, and the free end of a skid chain secured therein by means of a cam locking bar.

Other objects of the invention will appear as the description proceeds.

In the accompanying drawings which form a part of my application,

Like characters of reference are used throughout the following specification and the accompanying drawings to designate corresponding parts.

Figure 1:
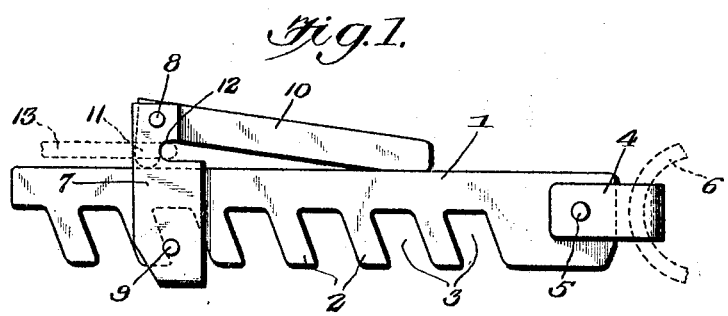
Figure 1 is a side elevation of my improved fastener.
Figure 2:
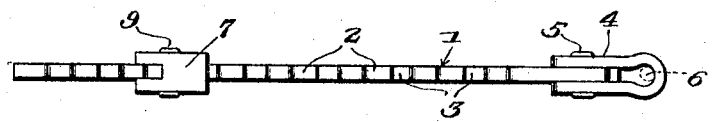
Figure 2 is a plan view of the same.
Figure 3:
Figure 3 is an end view of the fastener, showing the several elements in locked position.
Figure 4:
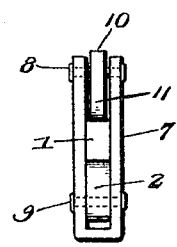
Figure 4 is an end view of the fastener, showing the elements in open or unlocked position.
Figure 4:
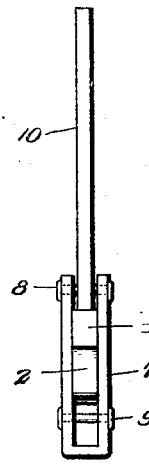

My improved fastener comprises a bar or body member 1, which is formed with a plurality of spaced angularly disposed depending lugs 2, the same being so arranged as to provide a plurality of spaced notches 3. A clevis 4 is pivoted at 5 to one end of the body member 1, and is adapted to be attached to a link 6 at one end of an anti-skid chain.

A U-shaped clamping member 7 is provided with spaced transversely extending pins 8 and 9, and is adapted to be slidably positioned over the body member 1 of the fastener, as clearly illustrated in Figure 1 of the drawings. In this position, the pin 8 will be above the bar or body member 1, while the pin 9 will be below the said body member, and in cooperative relation with the depending lugs 2. A locking or clamping arm 10 is pivoted on the pin 8, and is formed with a cam shoulder 11 at its inner end, for purposes hereinafter described. The clamping member 7 is provided with a link engaging notch 12 adjacent the pin 8, and is adapted to receive and retain a link 13 on the free end of the anti-skid chain, and to hold the same in clamped and locked position, when the arm 10 is turned in the position shown in Figure 1 of the drawings.

The mode of operation of my improved fastener is as follows: Assuming that an anti-skid chain is provided with a fastener made in accordance with my invention, and the chain is placed on a tire, the person fastening the chain in position will draw the same taut, after which the link 13 will be placed over the arm 10, and into the notch 12. The clamping member 7 will then be slid toward the clevis 4 as far as possible. After this, the member 7 will be forced upwardly until the pin 9 engages in the nearest notch between the depending lugs 2, and the arm 10 forced into a substantially parallel plane with the body member 1, which movement will cause the cam shoulder 11 to hold the link 13 in locked position. The reverse operation will unfasten the fastener so that the chain may be removed from the tire.

It will be understood that I do not intend to limit myself to the specific construction of the fastener illustrated, as many minor changes in detail of construction may be resorted to without departure from the spirit of the invention.

What is claimed is:—

1. A fastener for anti-skid chains comprising a notched bar, a member slidable thereon, a pin carried by said member adapted to seat in one of said notches, a chain engaging notch formed in the opposite end of said slidable member, and means for locking the free end of an auto-skid chain therein.

2. The subject matter as set forth in claim 1, and a cam locking arm for locking the free end of an anti-skid chain in the chain engaging notch.

3. A device of the character described, comprising a bar having a plurality of spaced depending lugs formed thereon, a U-shaped clamping member slidable on said bar, spaced pins carried by said clamping member, a link engaging notch formed in said clamping member intermediate said pins, and pivoted means carried by said clamping member adapted to cooperate with said notch to securely retain the free end of a skid chain in locked position.

4. The subject matter as set forth in claim 3, and a pivoted cam locking member for cooperating with the link engaging notch, whereby the free end of an anti-skid chain may be held in locked position.

5. The subject matter as set forth in claim 1, and a cam locking arm carried by said slidable member for locking the free end of an anti-skid chain in the chain engaging notch.

In testimony whereof I affix my signature.

DAVID ALLEN WARD.